United States Patent
Hirota et al.

(10) Patent No.: US 8,440,934 B2
(45) Date of Patent: May 14, 2013

(54) ARC START CONTROL METHOD

(75) Inventors: Shugo Hirota, Osaka (JP); Tetsuo Era, Osaka (JP); Tomoyuki Ueyama, Osaka (JP)

(73) Assignee: Daihen Corporation, Osaka-shi (JP)

( * ) Notice: Subject to any disclaimer, the term of this patent is extended or adjusted under 35 U.S.C. 154(b) by 313 days.

(21) Appl. No.: 12/678,946

(22) PCT Filed: Oct. 14, 2008

(86) PCT No.: PCT/JP2008/068586
§ 371 (c)(1),
(2), (4) Date: Mar. 18, 2010

(87) PCT Pub. No.: WO2009/051107
PCT Pub. Date: Apr. 23, 2009

(65) Prior Publication Data
US 2010/0193486 A1    Aug. 5, 2010

(30) Foreign Application Priority Data

Oct. 16, 2007  (JP) .................. 2007-268477
Dec. 26, 2007  (JP) .................. 2007-333651

(51) Int. Cl.
*B23K 9/12*  (2006.01)

(52) U.S. Cl.
USPC .............. 219/125.1; 219/137 R; 219/137.7; 901/42

(58) Field of Classification Search ............ 219/124.01, 219/125.1–125.12, 137 R, 137.7; 901/42
See application file for complete search history.

(56) References Cited

U.S. PATENT DOCUMENTS

| 6,541,734 B2* | 4/2003 | Shimogama ............... 219/125.1 |
| 2006/0163225 A1* | 7/2006 | Takahashi et al. ....... 219/125.11 |
| 2007/0023407 A1* | 2/2007 | Uezono et al. ........... 219/124.01 |
| 2007/0119841 A1 | 5/2007 | Nakata et al. |

FOREIGN PATENT DOCUMENTS

| JP | 2000-94133 | 4/2000 |
| JP | 2002-205169 | 7/2002 |
| JP | 2006-231414 | 9/2006 |
| JP | 2007-30018 | 2/2007 |

OTHER PUBLICATIONS

International Preliminary Report on Patentability from International Application No. PCT/JP2008/068586, mailed May 11, 2010.
Translation of Japanese Office Action issued on Dec. 4, 2012 in JP Appln. No. 2009-538092 (3 pages).

* cited by examiner

*Primary Examiner* — Tuan T Nguyen
*Assistant Examiner* — Lance Reidlinger
(74) *Attorney, Agent, or Firm* — Novak Druce Connolly Bove + Quigg LLP

(57) ABSTRACT

To start consumable electrode arc welding, an initial current is supplied to a welding wire after causing the welding wire to contact a base material and retracting the welding wire from the base material. Thereby, an initial arc is generated. The welding wire is retracted continuously for an initial arc lift period Ti with the initial arc maintained. Afterwards, the initial arc is switched to a steady arc. A predetermined weld pool formation period Tp is set after the initial arc lift period Ti. In the weld pool formation period, a weld pool formation current greater than the initial current is supplied with the initial arc maintained and the welding wire is caused to proceed and fed to the base material. In the weld pool formation period, a weld pool is formed by the initial arc without allowing the welding wire to release droplets and contact the base material.

5 Claims, 7 Drawing Sheets

ARC START CONTROL METHOD

FIELD OF THE INVENTION

The present invention relates to improvement of a retract arc start control method that generates an initial arc to start consumable electrode arc welding by lifting a welding wire from a base material after causing the welding wire to contact the base material, and switches the initial arc to an arc of a steady state after lifting the welding wire continuously with the initial arc maintained.

BACKGROUND OF THE INVENTION

As illustrated in FIG. 6, a welding start circuit ST is arranged outside of a welding power source PS. When receiving a welding start signal St from the welding start circuit ST, the welding power source PS outputs a welding voltage Vw and a welding current Iw to generate an arc and a feed control signal Fc to control the feed of a welding wire 1. As the welding start circuit ST, a programmable logic controller (PLC), which controls welding steps, and a robot controller may be employed. A feed roll 5 is connected to a wire feed motor WM. The welding wire 1 is fed to a base material 2 via the interior of a welding torch 4 through rotation of the feed roll 5. An arc 3 is generated between the welding wire 1 and the base material 2 in a shield gas 6 by feeding power to the welding wire 1 through a feeder chip. When the wire feed motor WM rotates in a forward direction, the welding wire 1 is sent in a direction toward the base material 2 and thus proceeds. In contrast, when the wire feed motor EM rotates in a reverse direction, the welding wire 1 is moved in a direction separating from the base material 2 and thus retracted.

When the welding wire 1 and the base material 2 are held in contact (short-circuited) or an arc is generated, the welding current Iw flows between the welding wire 1 and the base material 2. Contrastingly, when the welding wire 1 and the base material 2 are separate from each other and the current state is a no-load state in which the arc 3 is not generated, the welding voltage Vw becomes a maximum value (a no-load voltage) and the welding current Iw does not flow between the welding wire 1 and the base material 2. The distance between the distal end of the welding wire 1 and the base material 2 is a wire distal end/base material distance Lw [mm]. Accordingly, the wire distal end/base material distance Lw is substantially equal to the arc length when an arc is generated.

FIG. 7 includes timing charts representing a conventional retract arc start control method performed by the welding apparatus illustrated in FIG. 6. FIG. 7(A) represents the welding start signal St, and FIG. 7(B) represents the feed control signal Fc. FIG. 7(C) represents the welding voltage Vw, and FIG. 7(D) represents the welding current Iw. FIG. 7(E) represents the wire distal end/base material distance Lw. The retract arc start control method will now be described with reference to FIGS. 7(A) to 7(E).

(1) Wire Slowdown Period from Time Point t1 to Time Point t2

At time point t1, with reference to FIG. 7(A), the welding start signal St is input and reaches a high level. Then, as represented by FIG. 7(B), the feed control signal Fc becomes a slow-down feed speed Fir and the welding wire starts to proceed. Normally, the slow-down feed speed Fir is set to a slow speed of approximately 1 to 2 m/min. This is because if the slow-down feed speed is raised, the arc start performance is deteriorated. Simultaneously, output of the welding power source PS is started and, with reference to FIG. 7(C), the welding voltage Vw is applied. Since the state at time point t1 is the non-load state, the welding voltage Vw is set to a non-load voltage Vn1. After time point t1, the welding wire proceeds and the wire distal end/base material distance Lw gradually decreases as represented by FIG. 7(E).

(2) Short Circuit Period from Time Point t2 to Time Point t3

When the distal end of the wire contacts the base material at time point t2, the wire distal end/base material distance Lw becomes zero as represented by FIG. 7(E), and the welding voltage Vw becomes a short circuit voltage of approximately several volts as represented by FIG. 7(C). Further, the welding current Iw becomes an initial current setting value Iir with reference to FIG. 7(D). The initial current setting value Iir is a low current value of approximately 10 A to 100 A. At this stage, by detecting the fact that the welding voltage Vw has become smaller than or equal to a reference voltage Vth as represented by FIG. 7(C), it is determined that the welding wire has been brought into contact with the base material. Further, at this stage, with reference to FIG. 7(B), the feed control signal Fc becomes a retract feed speed setting value Fbr having a negative value, and thus retract of the welding wire is started. However, in the short circuit period from time point t2 to time point t3, as represented by FIG. 7(E), the distal end of the wire and the base material are maintained in contact with each other due to a delay time caused by reversal of the rotation of the wire feed motor from the forward direction to the reverse direction or a delay time necessary for retracting the welding wire by a length corresponding to the play of the welding wire in the welding torch. Although the short circuit period varies depending on the type of the wire feed motor and the length of the welding torch, the short circuit period is normally 10 to 100 ms.

(3) Initial Arc Lift Period Ti from Time Point t3 to Time Point t4

When the distal end of the wire is separated from the base material as represented by FIG. 7(E), a current corresponding to the initial current setting value Iir is supplied and an initial arc is generated. When the initial arc is produced, with reference to FIG. 7(C), the welding voltage Vw reaches an arc voltage of several tens of volts, which exceeds the reference voltage Vth. In the predetermined initial arc lift period Ti (from time point t3 to time point t4), the welding wire is retracted continuously as represented by FIG. 7(B). This is because, if movement of the welding wire is switched from retract to proceed immediately after the initial arc has been produced, the wire and the base material may be caused to re-contact with each other due to an insufficient arc length. In order to prevent such re-contact and smoothly switch to a steady arc state, the welding wire is continuously retracted to increase the arc length with the initial arc maintained in the initial arc lift period. Retract of the welding wire is continued until the arc length becomes substantially equal to a steady arc length. The initial current for the initial arc is maintained at the low level in order to prevent the initial arc from melting the distal end of the wire and causing the arc to flare up. If the arc flares up when the welding wire is retracted, it is difficult to raise the arc accurately to a desirable value.

(4) Steady Arc State Period After Time Point t4

When the initial arc lift period Ti ends at time point t4, the feed control signal Fc becomes a steady feed speed setting value Fcr as represented by FIG. 7(B) and the welding wire re-starts to proceed. Simultaneously, with reference to FIG. 7(C), the welding voltage Vw is controlled to become equal to a predetermined voltage set value Vr, and, as represented by FIG. 7(E), a steady welding current Ic corresponding to the steady feed speed is supplied. In this manner, with reference to FIG. 7(E), the initial arc generating state is smoothly switched to the steady arc state. In the steady arc state, the arc represents a steady arc length Lc.

In the above-described control method, constant current control is performed on the initial current by the welding power source PS so as to control the current accurately. As represented by FIG. 7(D), the initial current is constant. However, there may be cases in which the current is suppressed to a small value when the welding wire contacts the base material at time point t2 and then increased in the short circuit period. This prevents an arc from being generated, and melting and joining the welding wire and the base material together when the welding wire and the base material are in contact. The above-described conventional art is disclosed in, for example, Patent Documents 1, 2.

In the conventional art illustrated in FIG. 7, the initial current, which has a lower current value than the current of the steady state, is supplied in the initial arc lift period Ti from time point t3 to time point t4. Accordingly, the heat provided to the base material becomes insufficient and, by time point t4, at which the welding wire re-starts to proceed at the steady feed speed and feed of the steady welding current Ic is started, a sufficient weld pool has not yet been formed in the base material. As a result, when the welding wire melts and produces droplets after time point t4, the droplets cannot completely transfer to the base material, thus causing spatter. Since the amount of the spatter is small, the spatter does not cause any problem in normal arc start methods other than the retract arc start method. However, since the retract arc start method is employed in high-quality welding, even a small amount of spatter may cause a problem.

Patent Document 1: Japanese Laid-Open Patent Publication No. 2006-231414
Patent Document 2: Japanese Laid-Open Patent Publication No. 2007-30018

SUMMARY OF THE INVENTION

Accordingly, it is an objective of the present invention to provide an arc start control method that suppresses spatter when a welding wire is restarted to proceed at a steady feed speed and a steady welding current is supplied in a retract arc start method.

To achieve the foregoing objective and in accordance with a first aspect of the present invention, an arc start control method is provided that includes generating an initial arc to start a consumable electrode arc welding by supplying an initial current to a welding wire after causing the welding wire to contact a base material and then retracting the welding wire from the base material, switching the initial arc to a steady arc state by supplying a steady welding current to the welding wire by causing the welding wire to proceed at a steady feed speed after retracting the welding wire continuously for an initial arc lift period with the initial arc maintained. According to the method, a weld pool formation period is set after the initial arc lift period. A weld pool is formed by the initial arc without allowing the welding wire to release droplets and contact the base material by supplying a predetermined weld pool formation current greater than the initial current and causing the welding wire to proceed at a predetermined weld pool formation feed speed to be fed to the base material with the initial arc maintained during the weld pool formation period.

In the above arc start control method, the welding wire is preferably retracted by feeding the welding wire through a feed roll.

In the above arc start control method, the welding wire is preferably retracted by moving a welding torch through which the welding wire is passed.

In these configurations, a weld pool is sufficiently formed by additionally setting the weld pool formation period. Since the welding wire is prevented from releasing droplets and short-circuit between the welding wire and the base material is prohibited in the weld pool formation period, generation of spatter is suppressed. Further, the steady arc state is brought about after the weld pool has been formed. This suppresses the generation of spatter caused by transfer of droplets to the base material and forms high-quality weld bead.

The above arc start control method may be performed using a robot welding apparatus having a teach pendant by which a welding condition is instructed, the method. According to this method, at least one or more of the weld pool formation period, the weld pool formation current, and the weld pool formation feed speed is preferably set through the teach pendant.

In this configuration, the set values of the weld pool formation period, the weld pool formation current, and the weld pool formation feed speed are changed easily in accordance with the welding conditions. This enhances the quality of the welding.

In the above arc start control method, the steady feed speed is preferably automatically set in accordance with a setting value of the steady welding current, and at least one or more of the weld pool formation period, the weld pool formation current, and the weld pool formation feed speed are preferably changed in accordance with the steady feed speed or the setting value of the steady welding current.

In this configuration, the weld pool formation period, the weld pool formation current, and the weld pool formation feed speed are set easily. This improves operability.

DETAILED DESCRIPTION OF THE PREFERRED EMBODIMENTS

First Embodiment

Figure 6:
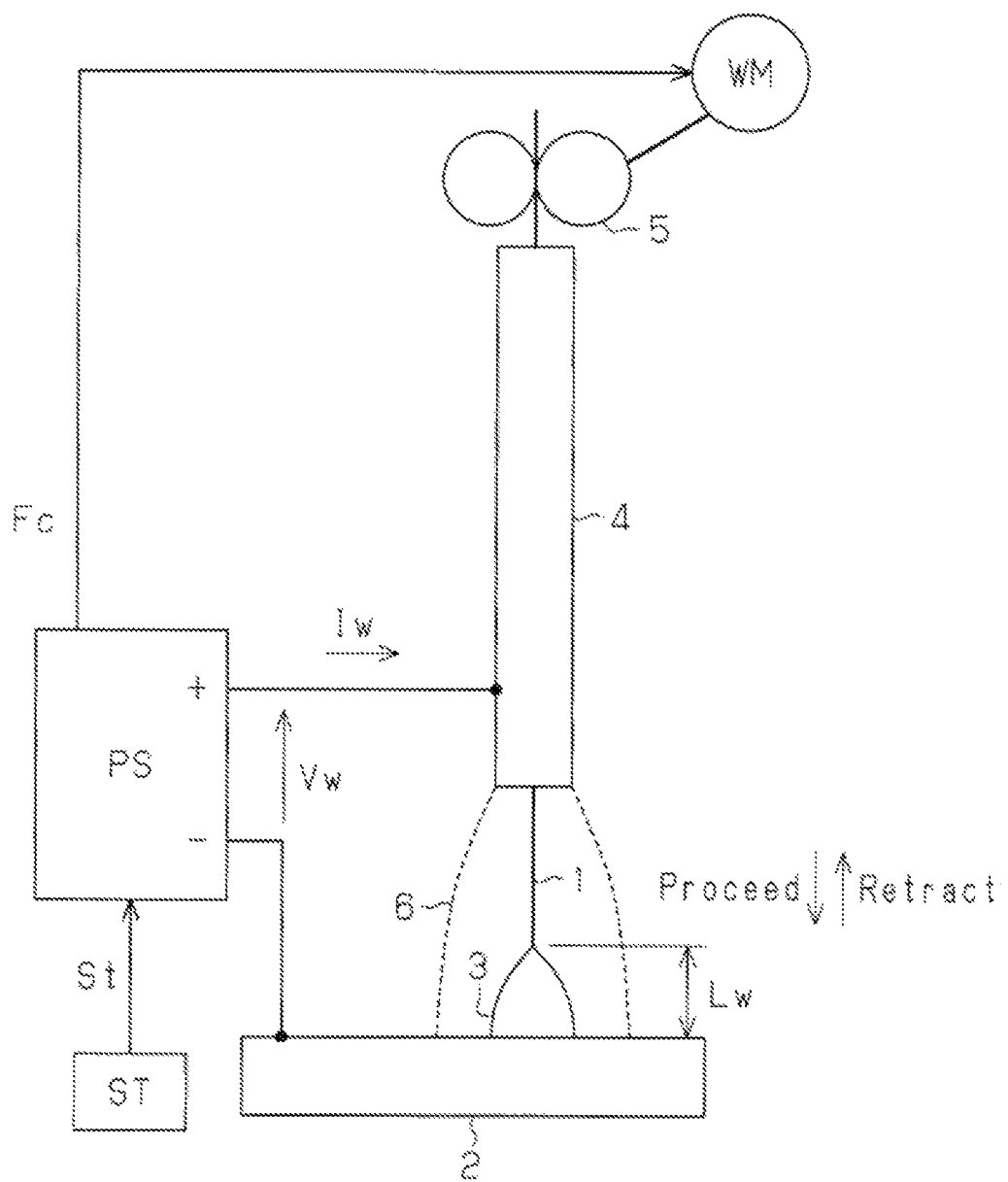
FIG. 6 is a diagram representing the configuration of a conventional consumable electrode arc welding apparatus.

A first embodiment of the present invention will now be described with reference to the attached drawings. A welding apparatus including a welding power source PS is identical with the welding device illustrated in FIG. 6.

Figure 1:
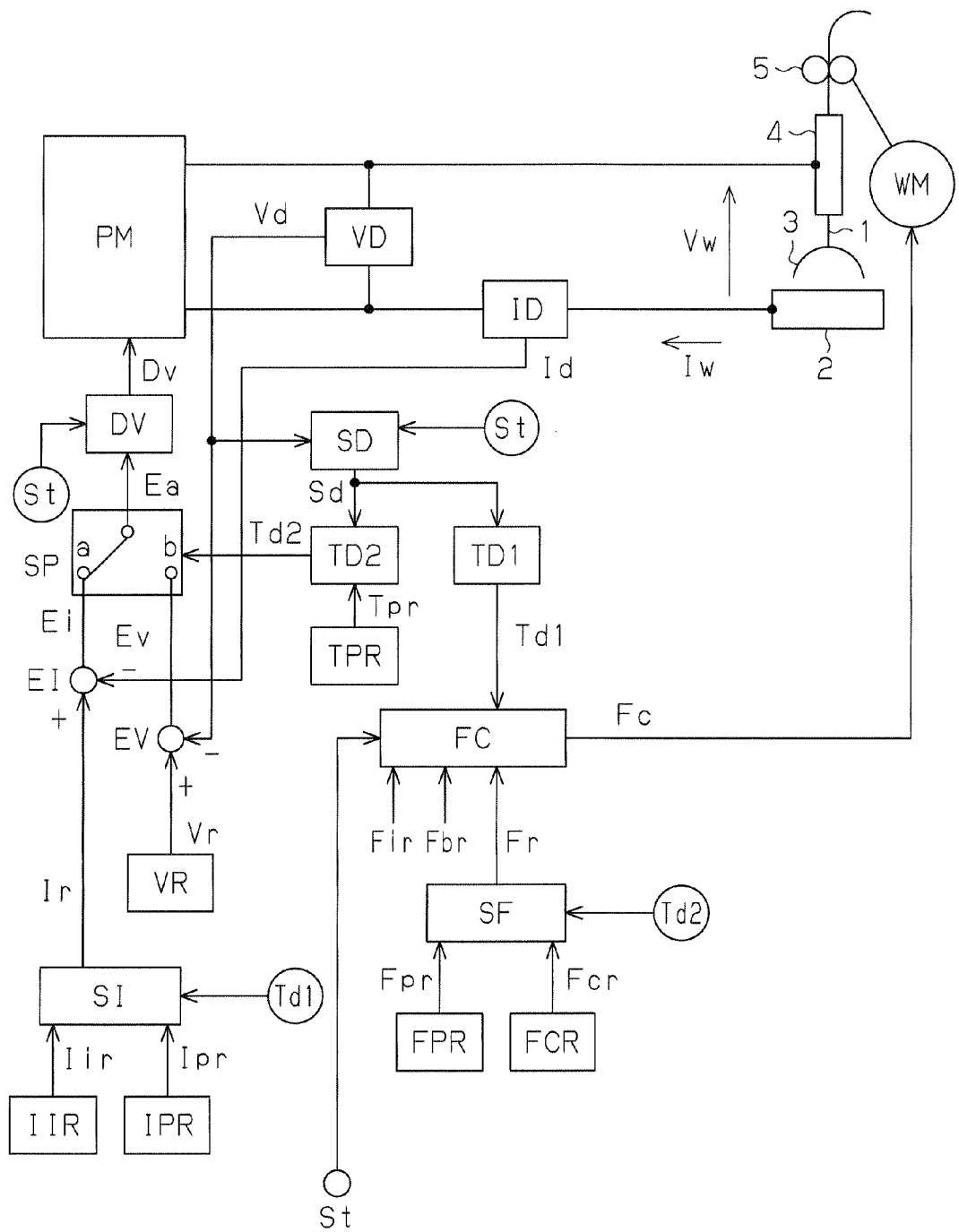
FIG. 1 is a block diagram representing a welding power source for carrying out an arc start control method according to a first embodiment of the present invention.

As illustrated in FIG. 1, a three-phase 200 V commercial power source is connected to the input side of a main power source circuit PM. The main power source circuit PM performs output control such as inverter control and thyristor phase control in accordance with a drive signal Dv, which will be described below, and outputs a welding voltage Vw and a welding current Iw. A welding wire 1 is sent through a welding torch 4 by a feed roll 5 of a wire feed motor WM. An arc 3 is generated between the welding wire 1 and a base material 2 and thus welding is carried out.

A voltage detection circuit VD detects the welding voltage Vw and outputs a voltage detection signal Vd. A current detection circuit ID detects the welding current Iw and outputs a current detection signal Id. When receiving a welding start signal St from the exterior, a short circuit determination circuit SD determines an initial short circuit period at the time when welding is started based on the voltage detection signal Vd, and outputs a short circuit determination signal Sd at a High level. A first delay circuit TD1 outputs a first delay signal Td1, which is generated by off-delaying the short circuit determination signal Sd by a predetermined initial arc lift period Ti. A first setting circuit TPR, which serves as a weld pool formation period setting circuit, outputs a first setting signal Tpr serving as a weld pool formation period setting signal for setting a predetermined weld pool formation period Tp. When receiving the first setting signal Tpr, a second delay circuit TD2 outputs a second delay signal Td2, which is generated by off-delaying the short circuit determination signal Sd by the sum (Ti+Tp). The difference between the period of the second delay signal Td2 and the period of the first delay signal Td1 is defined as the predetermined weld pool formation period Tp.

A feed control circuit FC outputs a feed control signal Fc. After having been output by the feed control circuit FC, the feed control signal Fc becomes a predetermined slow-down feed speed setting value Fir when the welding start signal St is input and rises to the High level. The feed control signal Fc becomes a predetermined retract feed speed setting value Fbr when the first delay signal Td1 rises to the High level (indicating a short circuit). The feed control signal Fc becomes a value of a feed speed setting signal Fr when the first delay signal Td1 falls to a Low level. A third setting circuit FPR, which serves as a weld pool formation feed speed setting circuit, outputs a third setting signal Fpr serving as a predetermined weld pool formation feed speed setting signal. A steady feed speed setting circuit FCR outputs a predetermined steady feed speed setting signal Fcr. When the second delay signal Td2 is at the High level, a feed speed switch circuit SF outputs the third setting signal Fpr as the feed speed setting signal Fr. In contrast, when the second delay signal Td2 is at the Low level, the feed speed switch circuit SF outputs the steady feed speed setting signal Fcr as the feed speed setting signal Fr.

An initial current setting circuit IIR outputs a predetermined initial current setting signal Iir. A second setting circuit IPR serving as a weld pool formation current setting circuit outputs a second setting signal Ipr as a predetermined weld pool formation current setting signal. When the first delay signal Td1 is at the High level, a current setting switch circuit SI outputs the initial current setting signal Iir as a current setting signal Ir. In contrast, when the first delay signal Td1 is at the Low level, the current setting switch circuit SI outputs the second setting signal Ipr as the current setting signal Ir.

A current error amplifier circuit EI amplifies the error between the current setting signal Ir and the aforementioned current detection signal Id, and outputs a current error amplification signal Ei. A voltage setting circuit VR outputs a predetermined voltage setting signal Vr. A voltage error amplifier circuit EV amplifies the error between the voltage setting signal Vr and the voltage detection signal Vd and outputs a voltage error amplification signal Ev. When the second delay signal Td2 is at the High level, the control switch circuit SP outputs the current error amplification signal Ei as an error amplification signal Ea. When the second delay signal Td2 is at the Low level, the control switch circuit SP outputs the voltage error amplification signal Ev as the error amplification signal Ea. Specifically, if the current error amplification signal Ei is selected, constant current control is performed on the welding power source. In contrast, if the voltage error amplification signal Ev is selected, constant voltage control is carried out on the welding power source. When the error amplification signal Ea is input after the welding start signal St has been input, a driver circuit DV outputs a drive signal Dv for carrying out output control of the main power source circuit PM.

Figure 2:
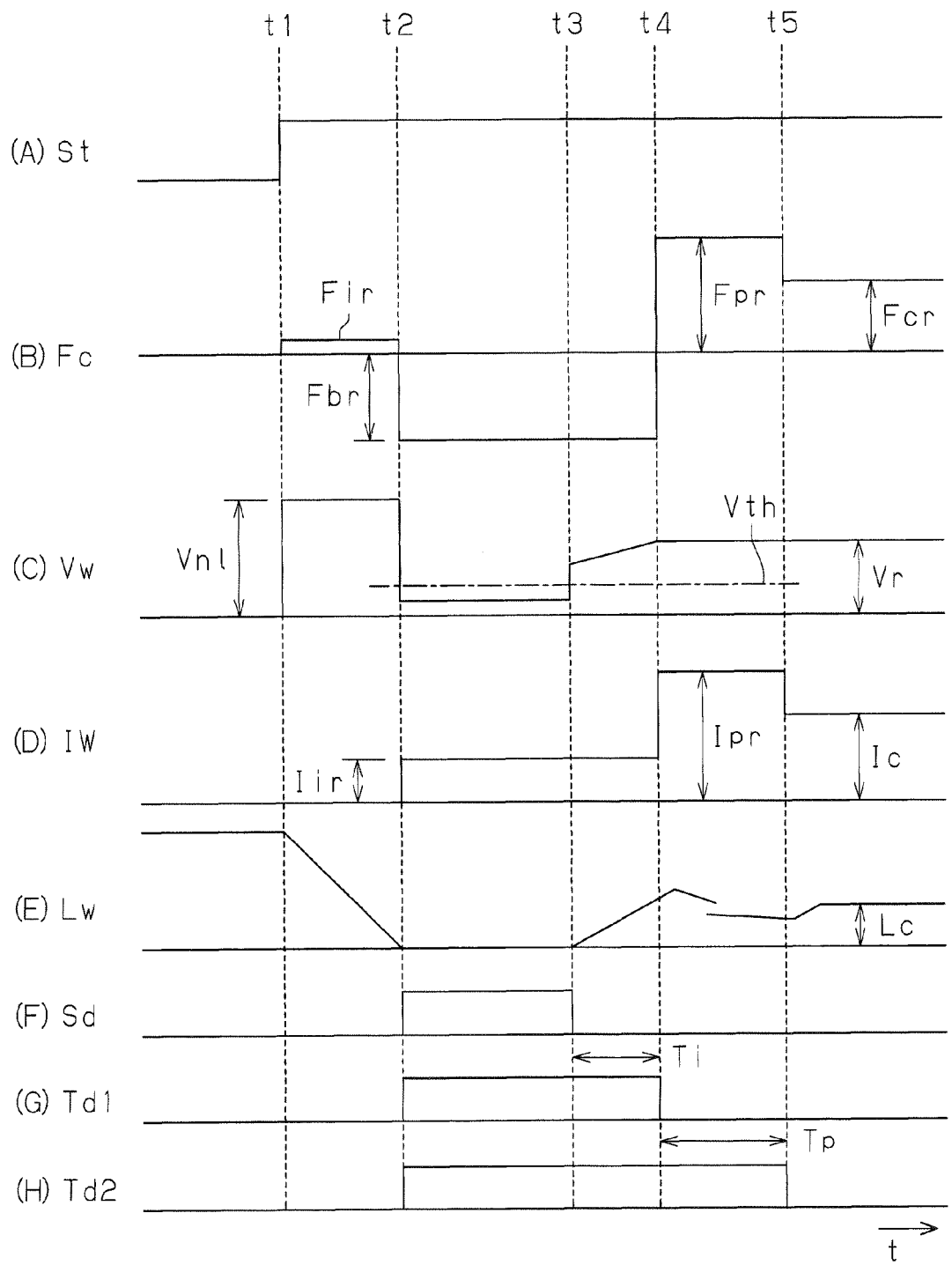
FIG. 2 is a timing chart representing respective signals of the welding power source illustrated in FIG. 1.
Figure 7:
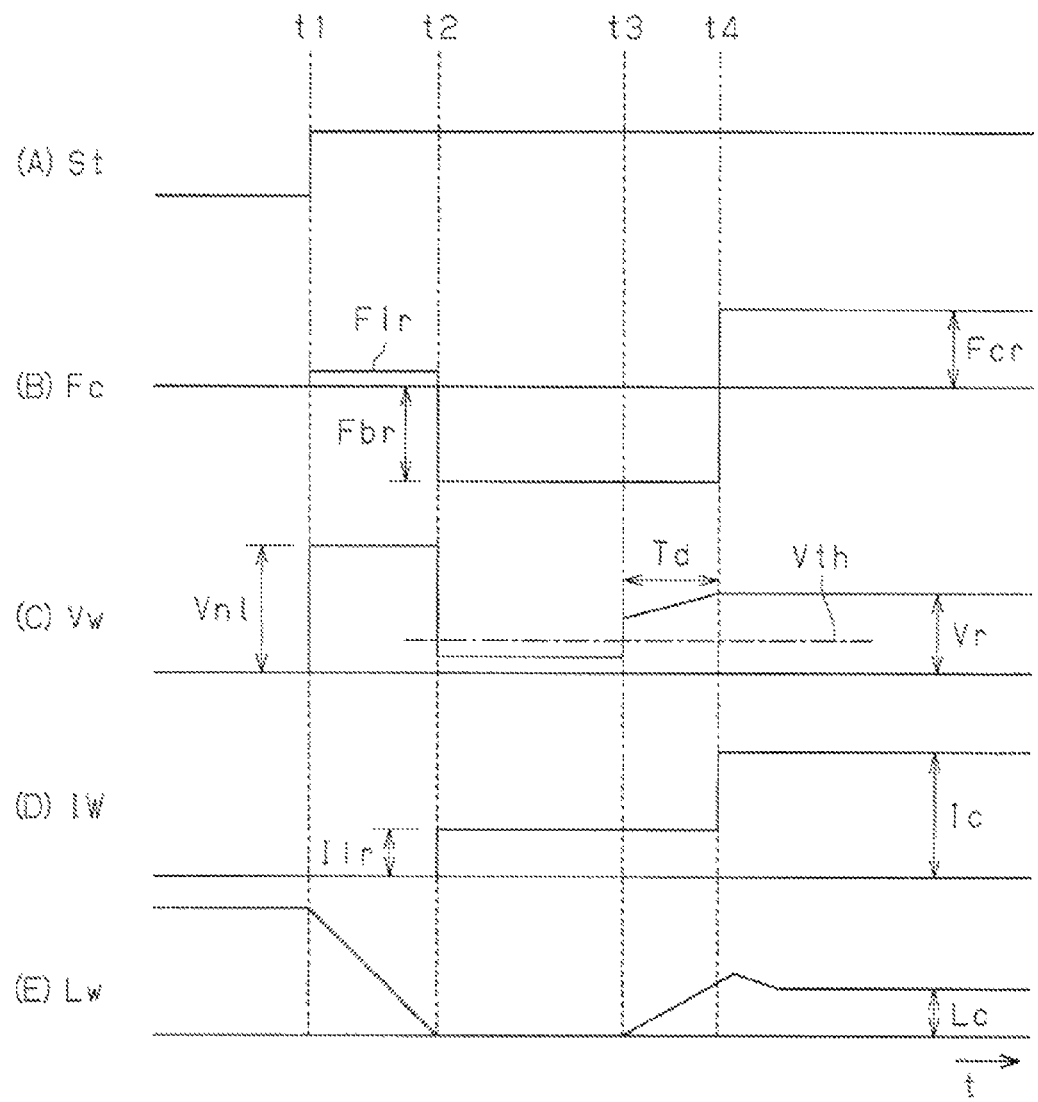
FIG. 7 is a timing chart representing a conventional arc start control method.

FIG. 2 includes timing charts representing the signals for the welding power source PS illustrated in FIG. 1. Specifically, FIG. 2(A) represents the welding start signal St, and FIG. 2(B) represents the feed control signal Fc of the welding wire. FIG. 2(C) represents the welding voltage Vw, and FIG. 2(D) represents the welding current Iw. FIG. 2(E) represents a wire distal end/base material distance Lw, and FIG. 2(F) represents the short circuit determination signal Sd. FIG. 2(G) represents the first delay signal Td1, and FIG. 2(H) represents the second delay signal Td2. FIG. 2 corresponds to FIG. 7, and the operation in the periods other than the weld pool formation period Tp from time point t4 to time point t5 is equivalent to the operation of the conventional technique. The operation of the present embodiment will hereafter be described with reference to FIGS. 2(A) to 2(H).

(1) Wire Slowdown Period from Time Point t1 to Time Point t2

When the welding start signal St is input and rises to the High level at time point t1 as represented by FIG. 2(A), the feed control signal Fc becomes the slowdown feed speed setting value Fir with reference to FIG. 2(B). This causes the welding wire to proceed. Simultaneously, the welding power source PS starts to output, applying the welding voltage Vw as represented by FIG. 2(C). Since the state at time point t1 is a non-load state, the welding voltage Vw is set to a non-load voltage Vn1. Since the welding wire proceeds since time point t1, the wire distal end/base material distance Lw becomes gradually smaller as shown in FIG. 2(E).

(2) Short Circuit Period from Time Point t2 to Time Point t3

When the distal end of the wire contacts the base material at time point t2, the wire distal end/base material distance Lw becomes zero as represented by FIG. 2(E), and the welding voltage Vw becomes a short circuit voltage of several volts with reference to FIG. 2(C). Further, with reference to FIG. 2(F), the short circuit determination signal Sd rises to the High level (indicating a short circuit). Correspondingly, the first delay signal Td1 rises to the High level as represented by FIG. 2(G), and the second delay signal Td2 reaches the High level as represented by FIG. 2(H). As a result, in FIG. 1, the current setting signal Ir becomes the initial current setting signal Iir, and the error amplification signal Ea becomes the current error amplification signal Ei. Accordingly, the constant current control is performed on the welding power source PS. This causes feed of the initial current determined by the initial current setting signal Iir as the welding current Iw, as represented by FIG. 2(D). Further, with reference to FIG. 2(B), the feed control signal Fc is set to the retract feed speed setting value Fbr, thus causing the welding wire to retract. However, in the short circuit period from time point t2 to time point t3, contact between the distal end of the wire and the base material is maintained, as indicated by FIG. 2(E), due to a delay caused by reversal of rotation of the wire feed motor from the forward direction to the reverse direction or a delay necessary for retracting the welding wire in the welding torch by the distance corresponding to the play of the welding wire.

(3) Initial Arc Lift Period Ti from Time Point t3 to Time Point t4

When the distal end of the wire separates from the base material at time point t3 with reference to FIG. 2(E), an initial arc is generated. At this stage, the welding voltage Vw reaches an arc voltage of several tens of volts, which exceeds a reference voltage Vth, as represented by FIG. 2(C). As a result, with reference to FIG. 2(F), the short circuit determination signal Sd drops to the Low level (indicating an arc period). Correspondingly, as represented by FIG. 2(G), the first delay signal Td1 is delayed by the predetermined initial arc lift period Ti until time point T4 and then drops to the Low level. Further, as represented by FIG. 2(H), the second delay signal Td2 is delayed until time point t5 and then falls to the Low level. The time difference between the time point at which the first delay signal Td1 falls to the Low level and the time point at which the second delay signal Td2 drops to the Low level is defined as the predetermined weld pool formation period Tp. As a result, in FIG. 1, the current setting signal Ir is maintained as the initial current setting signal Iir and the error amplification signal Ea is maintained as the current error amplification signal Ei. Accordingly, the constant current control is continuously performed and the initial current determined by the initial current setting signal Iir is supplied to the initial arc. Further, with reference to FIG. 2(B), the feed control signal Fc is maintained as the retract feed speed setting value Fbr. Accordingly, the welding wire is retracted continuously for the initial arc lift period Ti. This is because, if the movement of the welding wire is switched from retract to proceed immediately after the initial arc has been generated, the arc length is so small that the distal end of the wire and the base material may re-contact each other. In order to prevent such re-contact and smoothly switch to a steady arc state, the initial arc is maintained during this period and the welding wire is continuously retracted, thus increasing the arc length. Specifically, the retract of the welding wire is continued until the arc length becomes substantially equal to a steady arc length. The low current is supplied to the initial arc as the initial current so as to prevent the distal end of the wire from being molten by the initial arc and thus flaring up. If the arc flares up when the welding wire is retracted, it is difficult to accurately lift the arc to a predetermined length.

(4) Weld Pool Formation Period Tp from Time Point t4 to Time Point t5

In the weld pool formation period Tp, the short circuit determination signal Sd is at the Low level (indicating the arc period) as represented by FIG. 2(F), the first delay signal Td1 is at the Low level as represented by FIG. 2(G), and the second delay signal Td2 is at the High level as represented by FIG. 2(H). As a result, the feed speed setting signal Fr becomes a third setting signal Fpr, and the feed control signal Fc becomes the feed speed setting signal Fr, as shown in FIG. 2(B). The welding wire thus re-proceeds at a weld pool formation feed speed. Further, the current setting signal Ir becomes the second setting signal Ipr and the error amplification signal Ea is maintained as the current error amplification signal Ei. Accordingly, the constant current control performed on the welding power source PS is maintained. As a result, the weld pool formation current determined by the second setting signal Ipr is supplied. In the weld pool formation period Tp, the arc must be prohibited from releasing droplets. This is because, if the droplets are released before a sufficient weld pool is formed in the base material, the droplets form spatter and thus splash. Further, in the weld pool formation period Tp, the welding wire must be prohibited from contacting the base material to cause a short circuit between the welding wire and the base material. This is because if the distal end of the wire causes a short circuit before a sufficient weld pool is formed, spatter may be caused. Accordingly, it is necessary to set the second setting signal Ipr, the weld pool formation period Tp, and the third setting signal Fpr to such values that the above-described two problems do not occur. In other words, in order to form a weld pool, the weld pool formation current must be set to a value (for example, approximately 100 to 200 A) greater than the initial current, which is low (approximately 10 to 100 A). The weld pool formation period Tp must be set to, for example, approximately 50 to 200 ms, and the weld pool formation feed speed must be set to, for example, approximately 5 to 10 m/min. The weld pool formation current is controlled through the constant current control in order to apply a predetermined amount of heat to the base material and reliably form a desired weld pool. If the constant voltage control is carried out in the weld pool formation period Tp, the current varies depending on arc load and formation of the desired weld pool may thus be hampered.

(5) Steady Arc State Period After Time Point t5

In the steady arc state period, the short circuit determination signal Sd is at the Low level (indicating the arc period) as represented by FIG. 2(F), the first delay signal Td1 is at the Low level as represented by FIG. 2(G), and the second delay signal Td2 is at the Low level as represented by FIG. 2(H). Accordingly, the feed speed setting signal Fr becomes the steady feed speed setting signal Fcr, and the feed control signal Fc becomes the steady feed speed setting signal Fcr, as shown in FIG. 2(B). The welding wire is thus supplied at the steady feed speed. Further, since the error amplification signal Ea becomes the voltage error amplification signal Ey, the constant voltage control is performed on the welding power source PS. Accordingly, as represented by FIG. 2(C), the welding voltage Vw is controlled to be equal to the voltage setting signal Vr. Further, with reference to FIG. 2(D), the welding current Iw becomes the constant welding current Ic determined by the steady feed speed. In this manner, after time point t5, the arc is switched smoothly to the steady arc state. Since a sufficient weld pool has been formed by this point of time, spatter is hardly generated even if droplets are transferred from the welding wire to the base material 2.

It is desirable to change at least one or more of the three parameters (the weld pool formation current, the weld pool formation period, and the weld pool formation feed speed) to proper values in correspondence with the type of the welding wire, the type of shield gas, the steady feed speed (an average welding current), and the shape of a welding joint. If a welding robot is employed, at least one or more of the three parameters may be set through a teach pendant.

As illustrated in FIG. 2, the distal end of the wire is lifted from the base material by retracting the welding wire in the period from time point t2 to time point t4 (the short circuit period and the initial arc lift period). If welding is performed by a welding robot having a welding torch attached to the welding robot, movement of the welding wire may be suspended (or the welding wire may sent forward at a low speed) in the period from time point t2 to time point t4. In this case, the distal end of the welding wire may be separated from the base material by moving the arm of the robot in such a manner as to retract the welding torch. The same operation may be carried out in welding by an automatic welding apparatus having a mechanism that selectively raises and lowers a welding torch. The direction in which the welding torch is retracted is opposite to the direction in which the welding wire is fed. Accordingly, retract of a welding wire includes retract of the welding wire and retract of a welding torch by means of a robot or the like.

In the above-described first embodiment, a sufficient weld pool is formed in the base material by additionally setting the weld pool formation period. In the weld pool formation period, the welding wire is maintained in such a state that the welding wire is prohibited from releasing droplets and becoming short-circuited with respect to the base material. This suppresses spatter. After a weld pool is formed, the feed speed is switched to the steady feed speed and the steady welding current is supplied. This ensures switching to the steady arc state without producing spatter when the droplets are transferred to the base material. As a result, spatter generation is suppressed at the time when the arc is started, thus forming high-quality weld bead.

Second Embodiment

Figure 3:
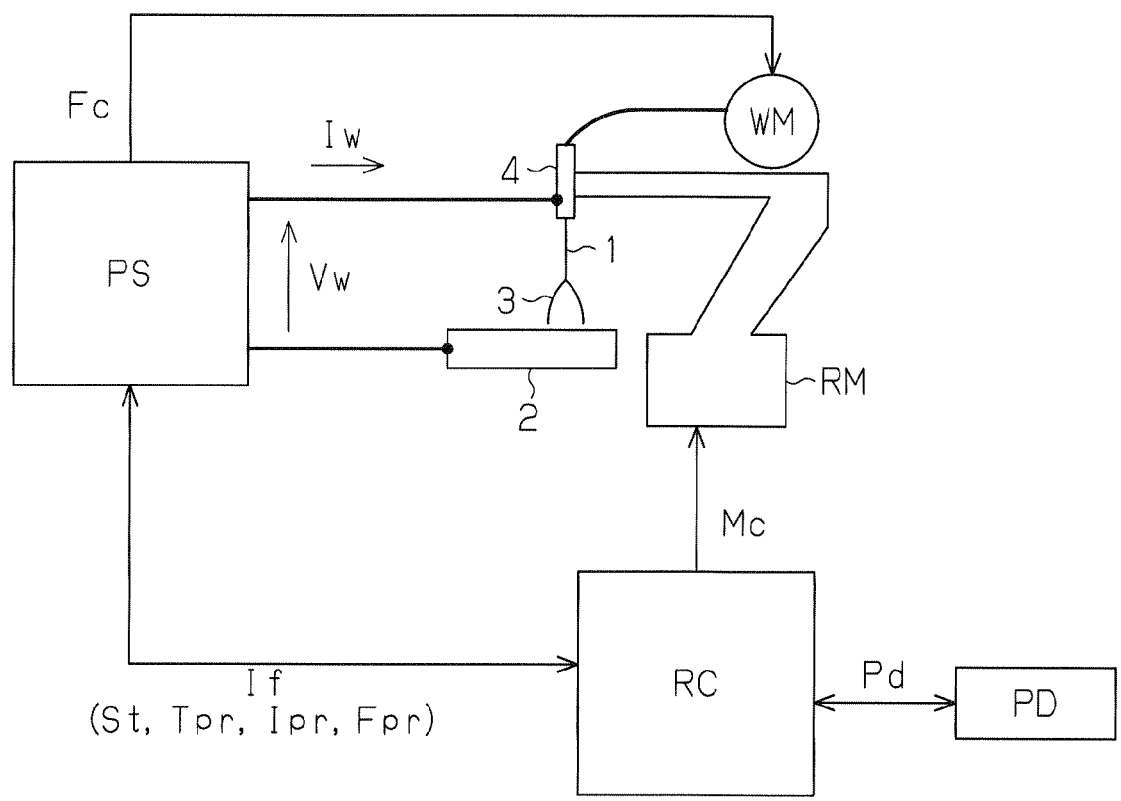
FIG. 3 is a diagram representing the configuration of a robot welding apparatus for carrying out an arc start control method according to a second embodiment of the present invention.

A second embodiment of the present invention will now be described with reference to FIG. 3.

The welding power source PS is identical with the welding power source illustrated in FIG. 1. When receiving an interface signal If, which will be described below, the welding power source PS outputs a welding voltage Vw and a welding current Iw to generate an arc 3 and a feed control signal Fc to control rotation of a wire feed motor WM. A robot controller RC outputs the interface signal If to the welding power source PS and an operation control signal Mc to actuate a plurality of servomotors of a robot body RM. A teach pendant PD outputs instruction signals Pd through which instructions are provided to operating programs and welding conditions are set. The interface signal If includes at least a welding start signal St, a first setting signal Tpr as a weld pool formation period setting signal, a second setting signal Ipr as a weld pool formation current setting signal, and a third setting signal Fpr as a weld pool formation feed speed setting signal. The first setting signal Tpr, the second setting signal Ipr, and the third setting signal Fpr can be set through the teach pendant PD. At least one or more of the setting signals Tpr, Ipr, Fpr may be selected and set through the teach pendant PD.

The wire feed motor WM and a welding torch 4 are mounted in the robot body RM. A welding wire 1 is fed to a base material 2 through the welding torch 4 by the wire feed motor WM. The arc 3 is thus generated between the welding wire 1 and the base material 2.

According to the second embodiment, at least one or more of the weld pool formation period, the weld pool formation current, and the weld pool formation feed speed are set through the teach pendant. Accordingly, these setting values are easily changed to proper values in accordance with welding conditions. As a result, welding of a further improved quality is performed.

Third Embodiment

Figure 4:
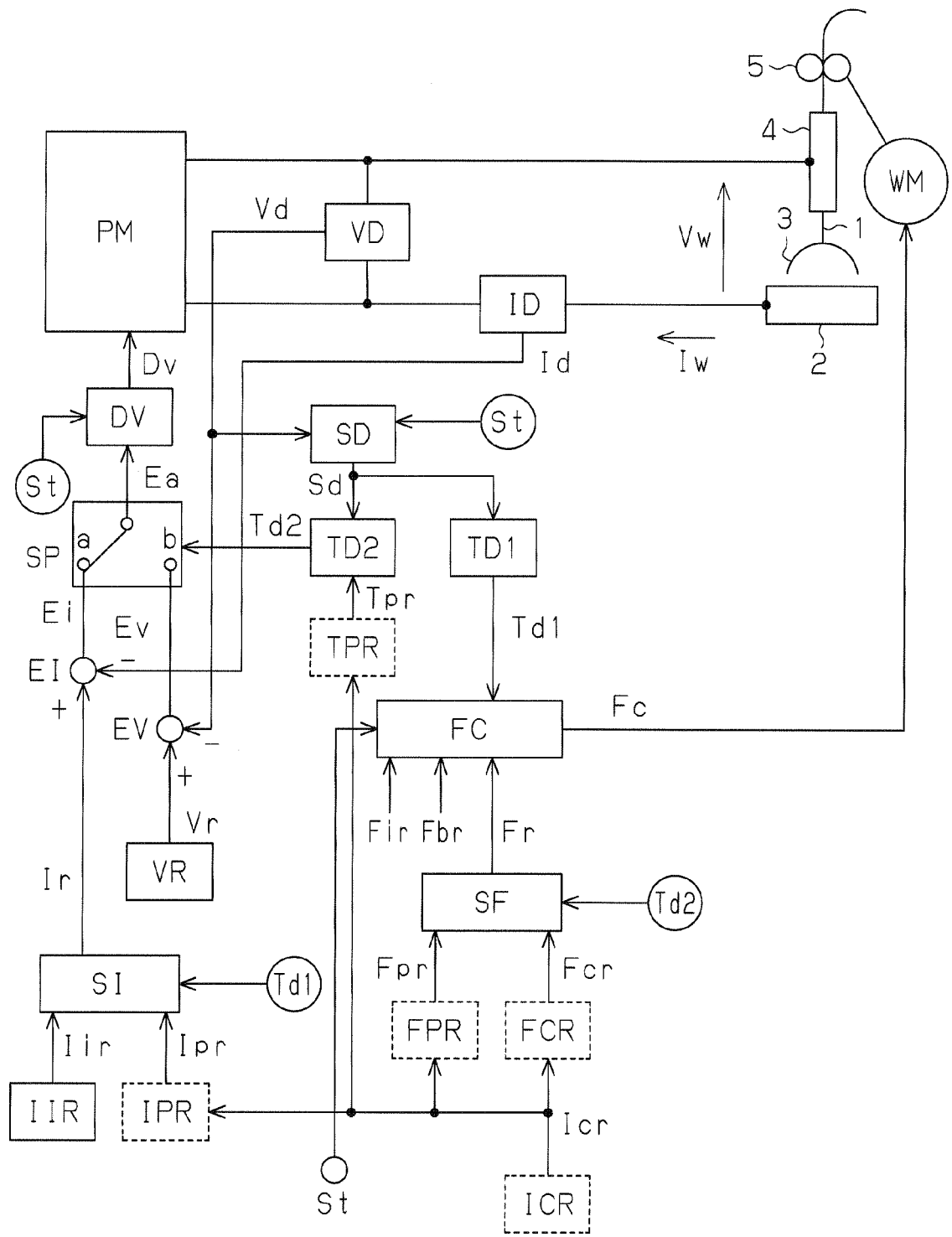
FIG. 4 is a block diagram representing a welding power source using for carrying out an arc start control method according to a third embodiment of the present invention.

A third embodiment of the present invention will hereafter be described with reference to FIG. 4. Same or like reference numerals are given to components of FIG. 4 that are the same as or like corresponding components of FIG. 1 and explanation of these components is omitted. In the description below, components that are different from corresponding components of FIG. 1, as indicated by broken lines, will be described with reference to FIG. 4.

FIG. 1 illustrates the case in which the steady feed speed setting signal Fcr is set directly. Contrastingly, since the appearance of weld bead and the depth of melting, which are important welding qualities, are determined based on the steady welding current Ic, a single-variable control method has been employed conventionally. In this method, the steady welding current Ic is set and a steady feed speed setting signal Fcr is set automatically in correspondence with the steady welding current Ic. FIG. 4 illustrates a case in which the single variable method is used.

A steady welding current setting circuit ICR outputs a predetermined steady welding current setting signal Icr. When receiving the steady welding current setting signal Icr, a steady feed speed setting circuit FCR calculates a steady feed speed setting signal Fcr using a predetermined single-variable function, as has been carried out conventionally.

When receiving the steady welding current setting signal Icr, a first setting circuit TPR calculates a first setting signal Tpr in accordance with a predetermined period function. When receiving the steady welding current setting signal Icr, a second setting circuit IPR outputs a second setting signal Ipr in accordance with a predetermined current function. When receiving the steady welding current setting signal Icr, a third setting circuit FPR outputs a third setting signal Fpr in accordance with a predetermined feed speed function. In this manner, the first setting signal Tpr, the second setting signal Ipr, and the third setting signal Fpr are set automatically in response to the steady welding current setting signal Icr.

Figure 5:
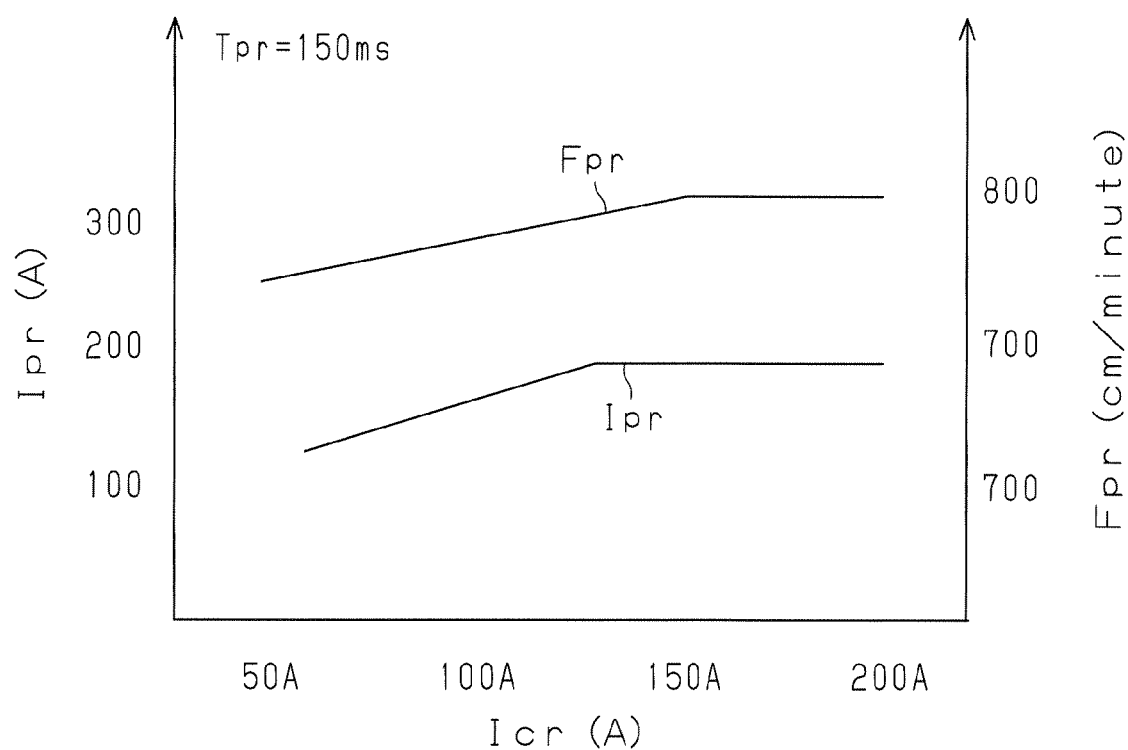
FIG. 5 is a graph representing an example of the current function and the feed speed function of FIG. 4.

In FIG. 5, the axis of abscissas represents the steady welding current setting signal Icr, the left axis of ordinate represents the second setting signal Ipr, and the right axis of abscissas represents the third setting signal Fpr. FIG. 5 illustrates a case of metal inert gas welding employing a stainless steel wire having a diameter of 1.0 mm.

With reference to FIG. 5, in the current function Ipr=f(Icr), the second setting signal Ipr becomes greater as the steady welding current setting signal Icr becomes greater. In the feed speed function Fpr=g (Icr), the third setting signal Fpr becomes greater as the steady welding current setting signal Icr becomes greater. In FIG. 5, the period function Tpr=h (Icr) may be constant (Tpr=150 ms). At least one or more of the first setting signal Tpr, the second setting signal Ipr, and the third setting signal Fpr may be set automatically in accordance with the steady welding current setting signal Icr. Alternatively, since the steady feed speed setting signal Fcr is set automatically in accordance with the steady welding current setting signal Icr, the setting signals Tpr, Ipr, Fpr may be set automatically in accordance with the steady feed speed setting signal Fcr.

In the above-described third embodiment, at least one or more of the weld pool formation period, the weld pool formation current, and the weld pool formation feed speed are changed to proper values in accordance with the steady feed speed or the steady welding current setting value. Accordingly, the three parameters are set easily and thus operability is enhanced.

The above-described first to third embodiments may be employed in arc starting such as carbon dioxide arc welding, metal active gas welding, metal inert gas welding, pulse arc welding, and AC pulse arc welding, in addition to the consumable electrode arc welding method.

The invention claimed is:
1. An arc start control method comprising:
causing a distal end of a welding wire to contact a base material;
retracting the welding wire from the base material;

supplying an initial current to the welding wire after causing the welding wire to contact the base material for generating an initial arc;

retracting the welding wire continuously for an initial arc lift period with the initial arc maintained; and forming a weld pool by the initial arc without allowing the welding wire to release droplets and contact the base material by supplying a predetermined weld pool formation current greater than the initial current and causing the welding wire to proceed at a predetermined weld pool formation feed speed with the initial arc maintained; and supplying a steady welding current to the welding wire by causing the welding wire to proceed at a steady feed speed for switching the initial arc to a steady arc state.

2. The arc start control method according to claim 1, wherein the welding wire is retracted by feeding the welding wire through a feed roll.

3. The arc start control method according to claim 1, wherein the welding wire is retracted by moving a welding torch through which the welding wire is passed.

4. The arc start control method according to claim 1, the method being performed using a robot welding apparatus having a teach pendant by which a welding condition is instructed, the method further comprising: setting at least one or more of the weld pool formation period, the weld pool formation current, and the weld pool formation feed speed through the teach pendant.

5. The arc start control method according to claim 1 the method further comprising:

automatically setting the steady feed speed in accordance with a setting value of the steady welding current, and changing at least one or more of the weld pool formation period, the weld pool formation current, and the weld pool formation feed speed in accordance with the steady feed speed or the setting value of the steady welding current.

* * * * *